(12) United States Patent
Davis et al.

(10) Patent No.: US 8,411,194 B2
(45) Date of Patent: Apr. 2, 2013

(54) METHODS FOR COMBINING CAMERA AND PROJECTOR FUNCTIONS IN A SINGLE DEVICE

(75) Inventors: Michael T. Davis, Richardson, TX (US); Daniel J. Morgan, Denton, TX (US); Amit Saha, Plano, TX (US); Roger S. Carver, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 224 days.

(21) Appl. No.: 11/161,912

(22) Filed: Aug. 22, 2005

(65) Prior Publication Data

US 2007/0040921 A1 Feb. 22, 2007

(51) Int. Cl.
*H04N 5/225* (2006.01)
*H04N 5/222* (2006.01)

(52) U.S. Cl. ............ 348/340; 348/333.1; 348/344

(58) Field of Classification Search ............ 348/339, 348/343, 340, 333.1, 305, 344; 353/98; 359/447
See application file for complete search history.

(56) References Cited

U.S. PATENT DOCUMENTS

| | | | |
|---|---|---|---|
| 4,067,026 A | 1/1978 | Pappanikolaou | |
| 4,615,595 A * | 10/1986 | Hornbeck | 353/122 |
| 5,258,844 A | 11/1993 | Nakayama et al. | |
| 5,457,493 A * | 10/1995 | Leddy et al. | 348/164 |
| 5,528,297 A | 6/1996 | Seegert et al. | |
| 5,612,736 A * | 3/1997 | Vogeley et al. | 348/207.99 |
| 5,636,001 A * | 6/1997 | Collier | 355/41 |
| 5,648,655 A * | 7/1997 | Rostoker | 250/208.1 |
| 5,764,329 A * | 6/1998 | Chen et al. | 349/193 |
| 5,774,254 A * | 6/1998 | Berlin | 359/259 |
| 6,474,819 B2 | 11/2002 | Yoder et al. | |
| 6,643,069 B2 * | 11/2003 | Dewald | 359/629 |
| 6,700,606 B1 * | 3/2004 | Borza | 348/218.1 |
| 6,807,671 B2 * | 10/2004 | Horimai | 720/674 |
| 6,830,345 B2 * | 12/2004 | Kamm et al. | 353/122 |
| 7,012,730 B2 * | 3/2006 | Handschy et al. | 359/290 |
| 7,081,956 B1 * | 7/2006 | Lalovic et al. | 356/400 |
| 7,128,425 B2 * | 10/2006 | Kumai | 353/119 |
| 7,354,167 B2 * | 4/2008 | Cho et al. | 359/850 |
| 7,358,998 B2 * | 4/2008 | Chou et al. | 348/344 |
| 7,500,758 B1 * | 3/2009 | Adachi et al. | 353/101 |
| 7,817,232 B2 * | 10/2010 | Zhang et al. | 349/116 |
| 2001/0013967 A1* | 8/2001 | Tsumura | 359/170 |
| 2002/0176015 A1* | 11/2002 | Lichtfuss | 348/333.1 |
| 2003/0122955 A1* | 7/2003 | Neidrich | 348/340 |
| 2003/0146282 A1* | 8/2003 | Tsikos et al. | 235/454 |
| 2003/0218753 A1* | 11/2003 | Reuter | 356/445 |
| 2005/0024594 A1 | 2/2005 | Kumai | |
| 2005/0206737 A1* | 9/2005 | Gim et al. | 348/208.11 |
| 2007/0153351 A1* | 7/2007 | Choa et al. | 359/224 |
| 2011/0019057 A1* | 1/2011 | Hsiung | 348/333.1 |

FOREIGN PATENT DOCUMENTS

JP 2002171428 A * 6/2002

* cited by examiner

*Primary Examiner* — Chieh M Fan
*Assistant Examiner* — Carramah J Quiett
(74) *Attorney, Agent, or Firm* — Warren L. Franz; Wade J. Brady, III; Frederick J. Telecky, Jr.

(57) ABSTRACT

Described are handheld devices with combined image capture and image projection functions. One embodiment includes modulating and capturing a light beam along the same optic path. In another embodiment, the optical components are operable to switch between projection and capture modes. In yet another embodiment, the optical components may be formed on the same semiconductor substrate thereby increasing functionality.

8 Claims, 8 Drawing Sheets

METHODS FOR COMBINING CAMERA AND PROJECTOR FUNCTIONS IN A SINGLE DEVICE

TECHNICAL FIELD

Disclosed embodiments relate to handheld devices, and more particularly to combining image capture and image projection functions within a single device.

BACKGROUND

Small, handheld electronic devices such as personal digital assistants (PDAs) and cell phones have incorporated still and/or video camera capabilities, and the trend is expanding. However, these devices have limited display capabilities because of their small size. Consequently, the small display size limits a user's ability to view or share pictures and/or videos with others.

SUMMARY

New and efficient light sources such as light emitting diodes (LEDs) have made it possible to construct very small projectors with digital light processing (DLP™) technology that can project images that are large enough and bright enough for small groups of people to share. Combining image projection and image capture functions in very small handheld devices will thereby overcome the direct-view display size limitation, and allow users to make small group presentations or put on family slideshows or videos.

Described are handheld devices with combined image capture and image projection functions. The disclosed handheld devices are operable to both project and capture images, thereby overcoming the direct-view display size limitation. One embodiment of the handheld device includes a light source projecting a light beam along a first optic path and being modulated along a second optic path by a reflective light modulator. An image sensor may then capture an image reflected from the second optic path back along the first optic path by the reflective light modulator. In another embodiment, the reflective light modulator and the image sensor may be situated on a mechanical structure that is operable to switch between providing the reflective light modulator for image projection and providing the image sensor for image capture. In yet another embodiment, the reflective light modulator and the image sensor may be formed on the same semiconductor substrate, with the image sensor operable to capture an image reflected from multiple optic paths by the reflective light modulator.

DETAILED DESCRIPTION OF THE PREFERRED EMBODIMENTS

Figure 1:
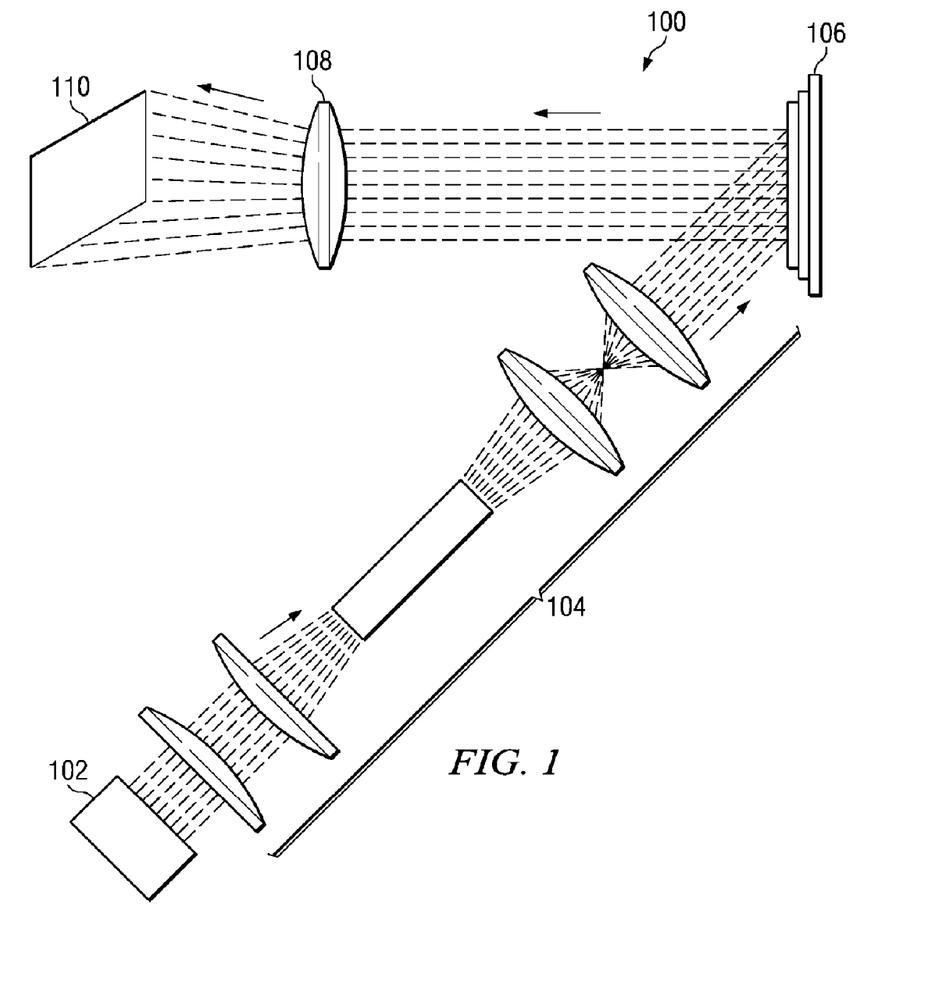
FIG. 1 is a diagram of an optical projection system.

FIG. 1 is a diagram of the various devices and components of an optical projection system 100 generally starting with a light source 102, such as light emitting diodes (LEDs) or lasers. The beams of light from the light source 102 are processed by optical devices 104, including but not limited to color separation elements such as color filters and color wheels, optics such as condensing, shaping, and relay lenses, and integrating elements such as an integrator. These optical devices 104 may substantially align, shape, configure, filter, or orient the beams of light. The processed light is then modulated by a spatial light modulator (SLM) 106 such as a digital micromirror device (DMD). The features and functions of SLMs and DMDs are further described in a commonly owned U.S. Pat. No. 6,038,056 entitled "Spatial light modulator having improved contrast ratio," Ser. No. 09/354,838, filed Jul. 16, 1999, which is incorporated herein by reference in its entirety for all purposes. The SLM or DMD 106 substantially modulates and aligns the light before it is focused and projected by projection optics 108 onto an image plane such as a screen 110.

Figure 2:
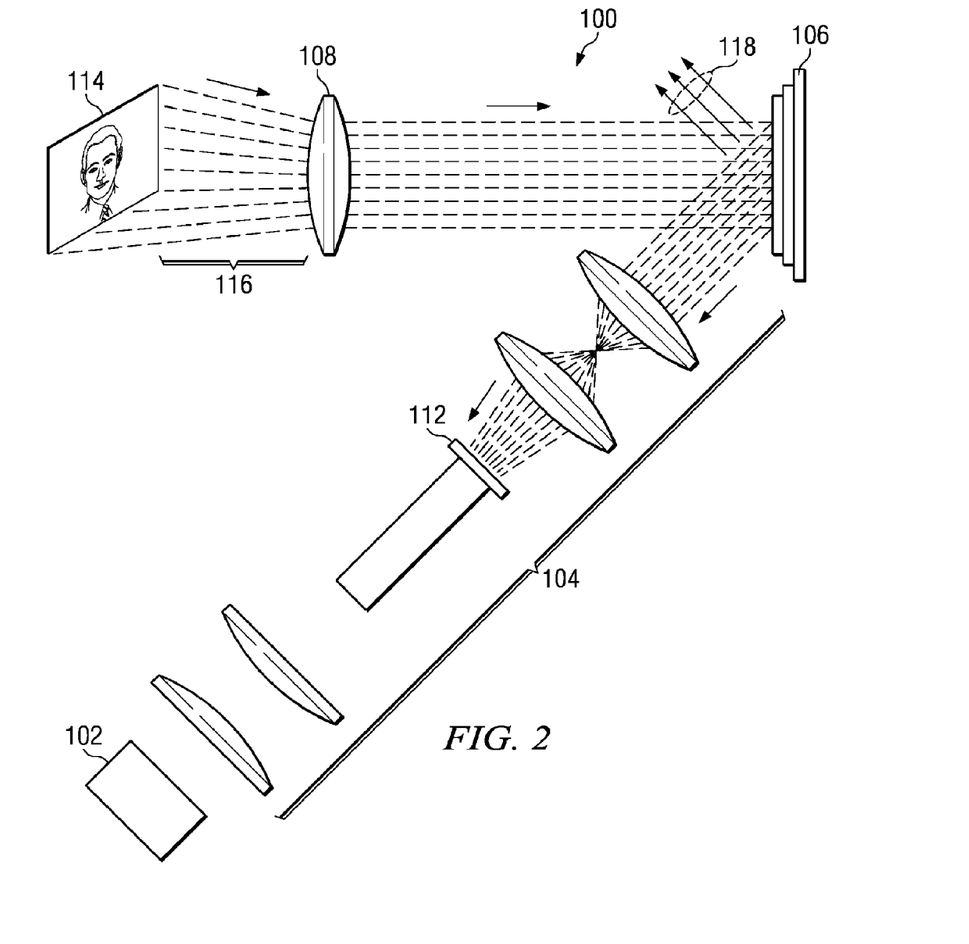
FIG. 2 is a diagram of an optical projection/camera system with a presently disclosed image sensor embodiment.

FIG. 2 illustrates a presently disclosed embodiment integrating an image-capturing device such as a charge-coupled device (CCD) image sensor 112 within an optical projection system 100. A complementary metal oxide semiconductor (CMOS) image sensor 112 may also be used. Both the CCD and the CMOS image sensors 112 digitally capture images by converting light into electric charge and processing the charge into electronic signals. The electronic signals may then be stored on an image processing electronics (not shown). Additionally, the image processing electronics (not shown) of the image sensor 112 may be integrated with the processing electronics of the DLP chip 106. As illustrated, the CCD image sensor 112 resides within an optic path of the optical devices 104 between the light source 102 and the DMD 106. In image capture or camera mode, an incoming image 114 may be collected by the projection optics 108 and focused upon the DMD 106. The projection lens 108 is acting like a camera lens 108 whereby the lens 108 may refocus or shift as necessary to capture the image 114 at an optimal focal length 116.

Because of the DMD's 106 mirror-like surface, the incoming image 114 may be reflected toward the same optic path as that of the optical devices 104 and the CCD image sensor 112. The CCD image sensor 112 records and stores the incoming image 114 as it reflects off the DMD 106 and into the common optic path. One of the benefits of the presently disclosed embodiment is that alternating between projection mode and camera mode may be accomplished by sliding the CCD image sensor 112 into or out of the optic path of the optical devices 104. In this and in subsequent described embodiments, a mechanical actuator such as a motor, a relay, or other electromechanical devices may be provided to meet the mechanical movements. Additional advantages include the ability to match the size and resolution of the CCD image sensor 112 with the DMD 106 by matching the magnification between image projection and image capture. In another embodiment, depending on whether the DMD 106 mirrors are turned to the "on-state" or the "off-state," the incoming image 114 may be directed to an alternate optic path 118.

Figure 3A:
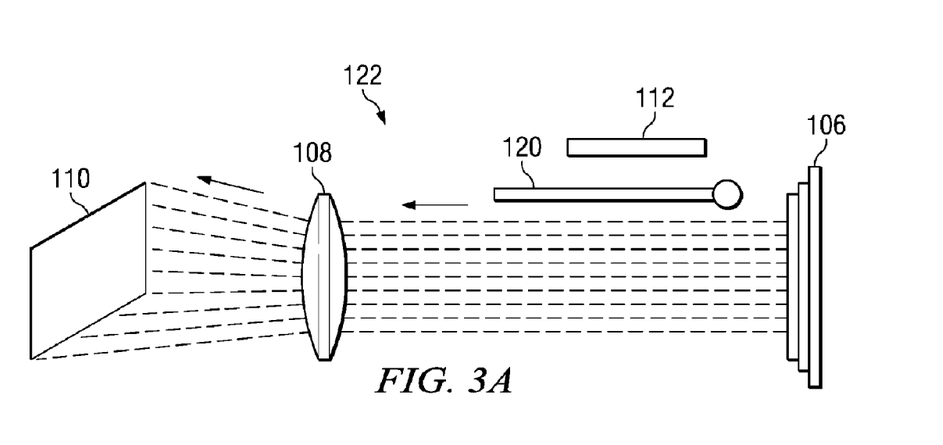
FIGS. 3A-3B are diagrams of an optical projection/camera system with a presently disclosed mirror/prism embodiment.
Figure 3B:
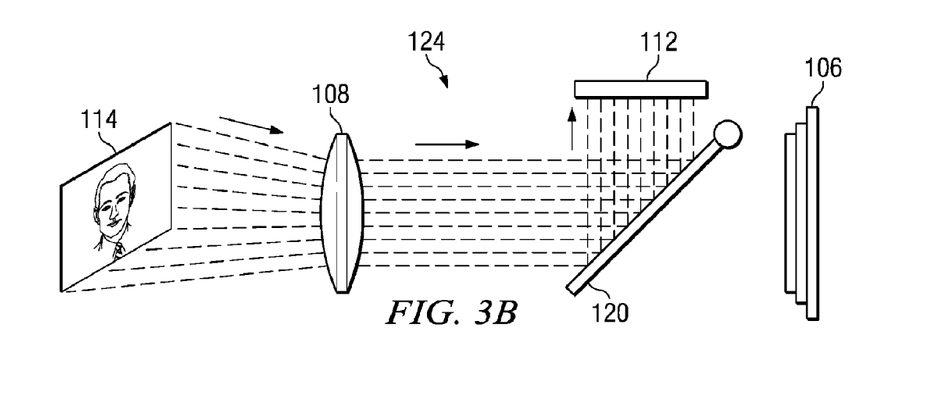

FIGS. 3A-3B illustrate another embodiment in which a CCD image sensor 112 is incorporated within an optical projection system. As illustrated, the CCD image sensor 112 is situated at 90 degrees relative to the DMD 106. A single mirror or prism 120 may be positioned parallel with and in front of the CCD image sensor 112. The single mirror or prism 120 actuates to one of two positions. In FIG. 3A projection mode 122, the single mirror 120 remains parallel with the CCD image sensor 112 thereby allowing light from the DMD 106 to be focused by the projection lens 108 and projected out onto a screen 110. In FIG. 3B camera mode 124, however, the single mirror 120 extends or flips out into the optic path between the DMD 106 and the camera lens 108. As a result, an incoming image 114 may be focused by the camera lens 108, reflected by the single mirror or prism 120, and captured by the CCD image sensor 112.

Figure 4A:
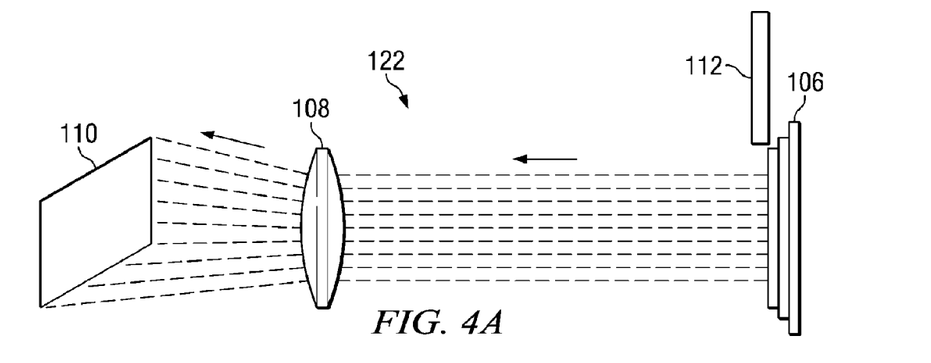
FIGS. 4A-4B are diagrams of an optical projection/camera system with a presently disclosed mechanical structure embodiment.
Figure 4B:
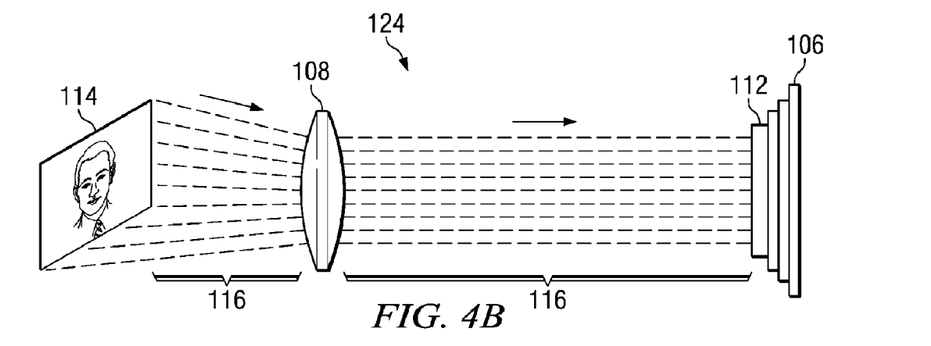

FIGS. 4A-4B illustrate another embodiment whereby a CCD image sensor 112 can slide into position depending on the mode of operation. As illustrated, a CCD image sensor 112 may be positioned parallel with and in front of the DMD 106. In FIG. 4A projection mode 122, the CCD image sensor 112 resides off the optic path thereby allowing light from the DMD 106 to be focused by the projection lens 108 and projected out onto a screen 110. In FIG. 4B camera mode 124, however, the CCD image sensor 112 rotates or translates into the optic path between the DMD 106 and the camera lens 108. As a result, an incoming image 114 is focused by the camera lens 108 and captured by the CCD image sensor 112. The lens 108 may automatically or manually refocus to compensate for optimal focal length 116 as necessary. Alternatively, the CCD image sensor 112 could be fixed and the DMD 106 could be the device that is switched in or out of the optic path.

Figure 5A:
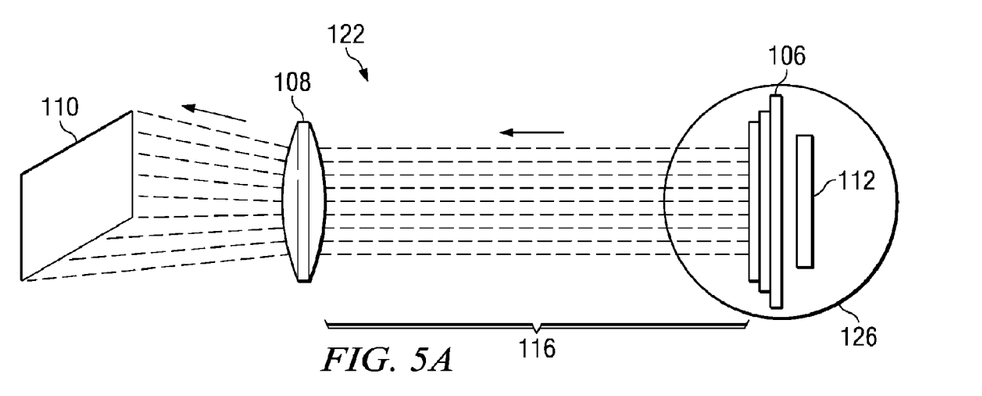
FIGS. 5A-5B are diagrams of an optical projection/camera system with a presently disclosed circular turret-like structure embodiment.
Figure 5B:
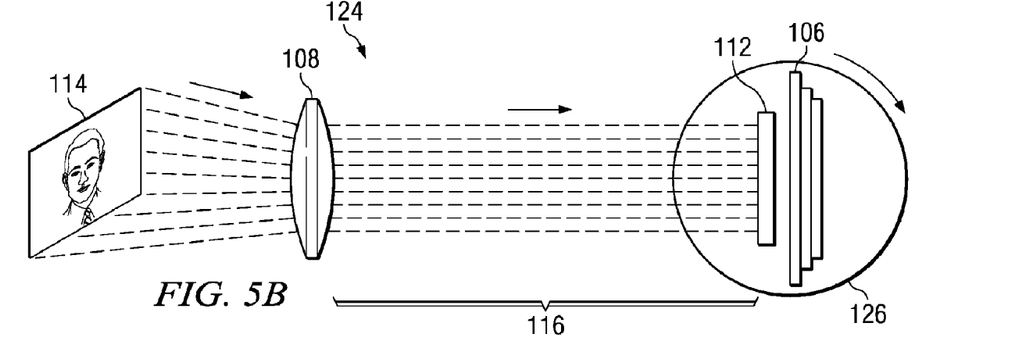

FIGS. 5A-5B illustrate another embodiment whereby a CCD image sensor 112 may be adjacent to a DMD 106 with their backs (non-functional surfaces) to each other on a circular turret-like structure 126. Also, the turret-like structure 126 need not be circular as long as it can substantially rotate about at least one axis. Alternatively, the CCD image sensor 112 and the DMD 106 may be flip-chip packaged together to a common substrate or circuit board. The CCD image sensor 112 and the DMD 106 may also be formed on the same semiconductor substrate. In FIG. 5A projection mode 122, the DMD 106 is blocking the CCD image sensor 112 thereby allowing light from the DMD 106 to be focused by the projection lens 108 and projected out onto a screen 110. In FIG. 5B camera mode 124, the circular turret-like structure 126 rotates thereby exposing the CCD image sensor 112 to the optic path rather than the DMD 106. As a result, an incoming image 114 may be focused by the camera lens 108 and captured by the CCD image sensor 112. The camera lens 108 may not have to refocus the incoming image 114 because the CCD image sensor 112 and the DMD 106 may be situated at the same focal length 116. Alternatively, the circular turret-type structure 126 may make full or partial rotations.

Figure 6A:
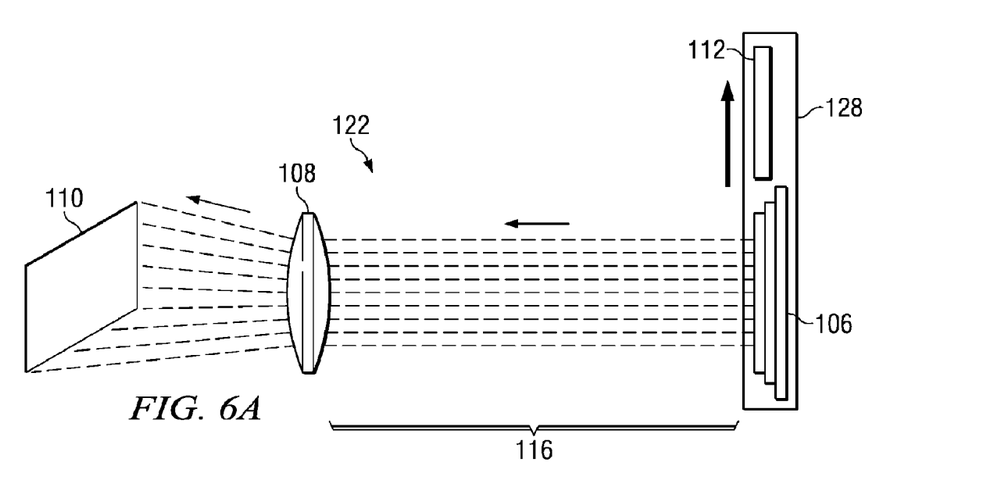
FIGS. 6A-6B are diagrams of an optical projection/camera system with another presently disclosed mechanical structure embodiment.
Figure 6B:
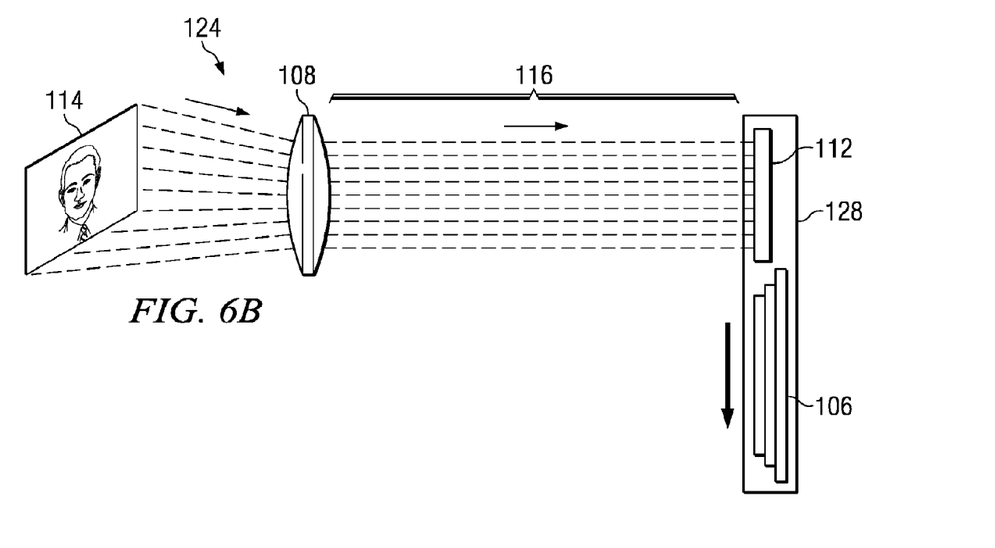

FIGS. 6A-6B illustrate another embodiment whereby a CCD image sensor 112 may be placed adjacent to a DMD 106 on a rectangular structure 128. The rectangular structure 128 need not be rectangular as long as the structure 128 can substantially translate about an axis. Additionally, the CCD image sensor 112 and the DMD 106 may be formed next to each other on the same semiconductor substrate or mounted together to a common substrate or circuit board in a multi-chip module. In FIG. 6A projection mode 122, the rectangular structure 128 translates in one direction (in this case upward as is shown in the figure) so that only the DMD 106 is exposed to the optic path thereby allowing light from the DMD 106 to be focused by the projection lens 108 and projected out onto a screen 110. In FIG. 6B camera mode 124, the rectangular structure 128 translates in the opposite direction (downward) thereby exposing only the CCD image sensor 112 to the optic path. As a result, the camera lens 108 focuses the incoming image 114 to be captured and stored by the CCD image sensor 112. No refocusing of the lens 108 may be necessary because the CCD image sensor 112 and the DMD 106 may be situated at the same focal length 116. Alternatively, the rectangular structure 128 may translate along more than one axis.

Figure 7A:
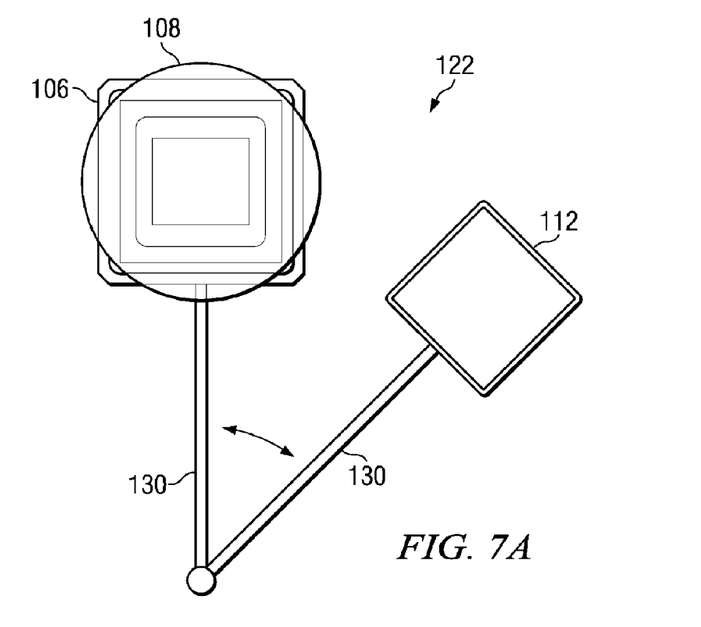
FIGS. 7A-7B are diagrams of an optical projection/camera system with a presently disclosed support structure embodiment.
Figure 7B:
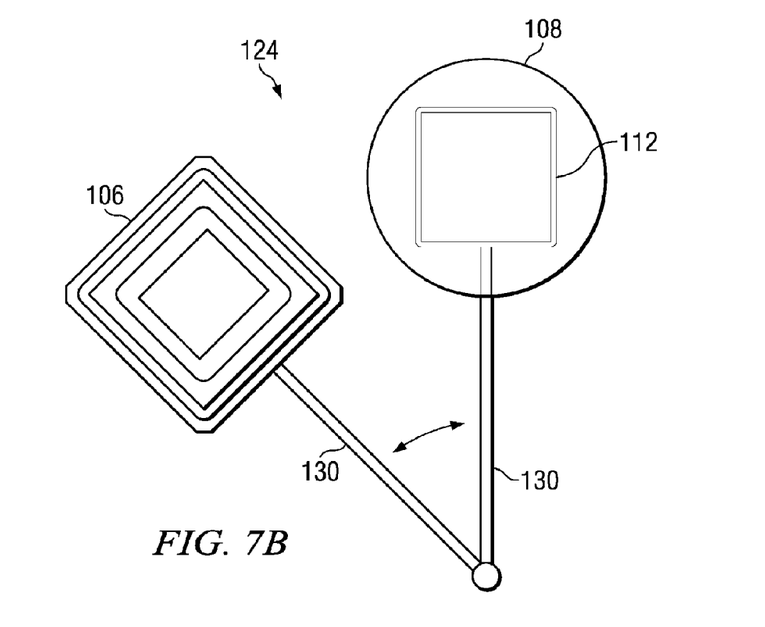

FIGS. 7A-7B illustrate another embodiment whereby a CCD image sensor 112 and a DMD 106 are each supported by a support structure 130. The CCD image sensor 112 and the DMD 106 may also be formed next to each other on the same semiconductor substrate, and maintained together as a single unit by a single support structure 130. In FIG. 7A projection mode 122, the support structure 130 for the DMD 106 is at the 12 o'clock position while the support structure 130 for the CCD image sensor 112 is at the 2 o'clock position. In this mode, the DMD 106 support structure 130 lines up the DLP chip 106 to the optic path thereby allowing light from the DMD 106 to be focused by the projection lens 108 and projected out onto a screen (not shown). The optic path is normal (coming out of the paper) to the DMD 106 while the projection lens 108 is parallel with the DMD 106 and is illustrated as being on top of the DMD 106. In FIG. 7B camera mode 124, the DMD 106 support structure 130 moves or rocks from the 12 o'clock position (in projection mode 122) to the 10 o'clock position (in camera mode 124), thereby taking the DLP chip 106 out of the optic path. Additionally, the camera lens 108 support structure 130 moves or rocks from the 2 o'clock position (in projection mode 122) to the 12 o'clock position (in camera mode 124) thereby lining up the CCD image sensor 112 to the optic path and allowing an incoming image (not shown) to be focused by the camera lens 108 and captured and stored by the CCD image sensor 112. Alternatively, the support structures 130 may "rock" optical devices 106, 112 into position (into an optic path) by various switching mechanisms including translating, rotating, or combinations thereof. Also, the degree or amount of moving or rocking need not have a fixed magnitude (from 12 o'clock to 10 o'clock), but may vary depending on design and device constraints.

Figure 8A:
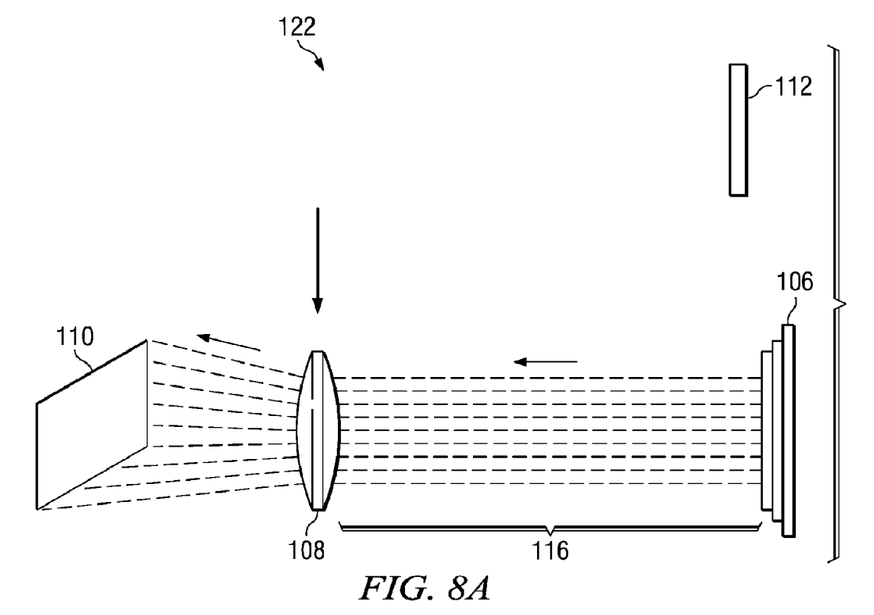
FIGS. 8A-8B are diagrams of an optical projection/camera system with a presently disclosed projection/imaging lens embodiment.
Figure 8B:
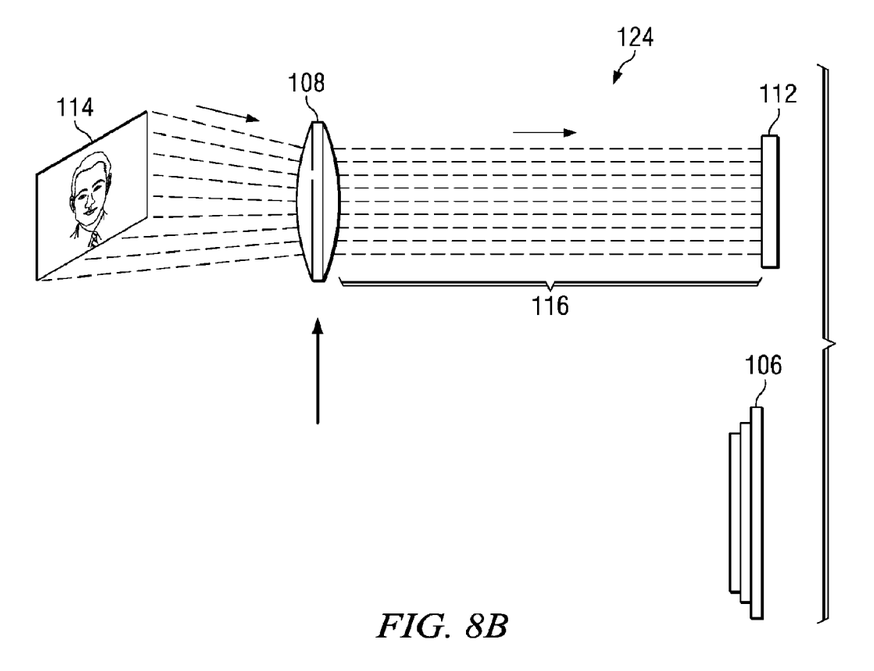

FIGS. 8A-8B illustrate another embodiment whereby a lens 108 switches back and forth between FIG. 8A projection mode 122 and FIG. 8B camera mode 124. As illustrated, a CCD image sensor 112 is adjacent to a DMD 106. The two devices 112, 106 may also be formed on the same semiconductor substrate or mounted to a common substrate or circuit board. Furthermore, the processing electronics (not shown) for the two optical devices 112, 106 may be integrated. In FIG. 8A projection mode 122, a projection lens 108 resides within an optic path of the DMD 106 thereby allowing light from the DMD 106 to be focused by the projection lens 108 and projected out onto a screen 110. In FIG. 8B camera mode 124, a camera lens 108 resides within an optic path of the CCD image sensor 112 thereby allowing an incoming image 114 to be focused by the camera lens 108 and captured and stored by the CCD image sensor 112. The lens 108 switches back and forth depending on the mode of operation 122, 124, and may also automatically or manually refocus to compensate for optimal focal length 116 as necessary. The various switching mechanisms may include translating, rotating, or combinations thereof.

Figure 9:
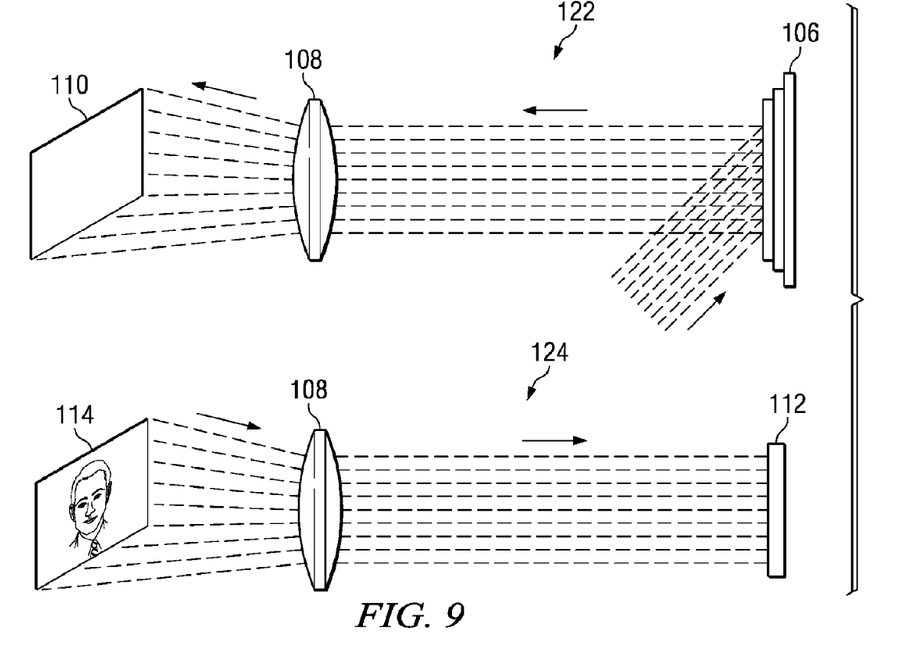
FIG. 9 is a diagram of an optical projection/camera system with a presently disclosed dual lens embodiment.

FIG. 9 illustrates another embodiment whereby two lenses 108 are provided within an optical projection system. As illustrated, a projection lens 108 resides in a DMD's 106 optic path during projection mode 122, and a camera lens 108 resides in a CCD image sensor's 112 optic path during camera mode 124. The two lenses 108 need not be the same and may be optimized based on the type of optical devices 112, 106 that are used. The lenses 108 may also have different magnification and resolution depending on the size of the DMD 106 and the size of the CCD image sensor 112. In addition, although the CCD image sensor 112 is adjacent to the DMD 106, the two devices 112, 106 may be formed on the same semiconductor substrate or mounted to a common substrate or circuit board. Furthermore, the processing electronics (not shown) of the two devices 112, 106 may be integrated. In projection mode 122, light from the DMD 106 may be focused by the projection lens 108 and projected out onto a screen 110, while in camera mode 124, an incoming image 114 is focused by the camera lens 108 and captured and stored by the CCD image sensor 112. The two lenses 108 may also allow images to be captured and projected simultaneously.

Figure 10A:
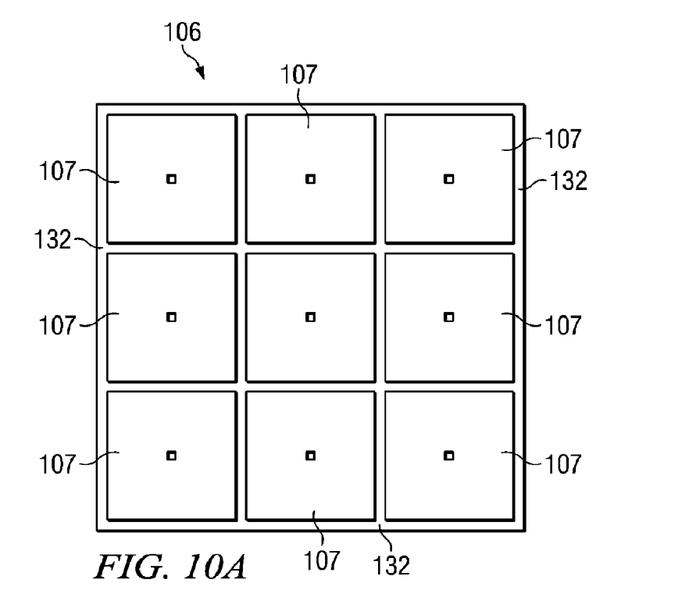
FIG. 10A illustrates a top-down view of a 3×3 array of digital micromirror device cells.
Figure 10B:
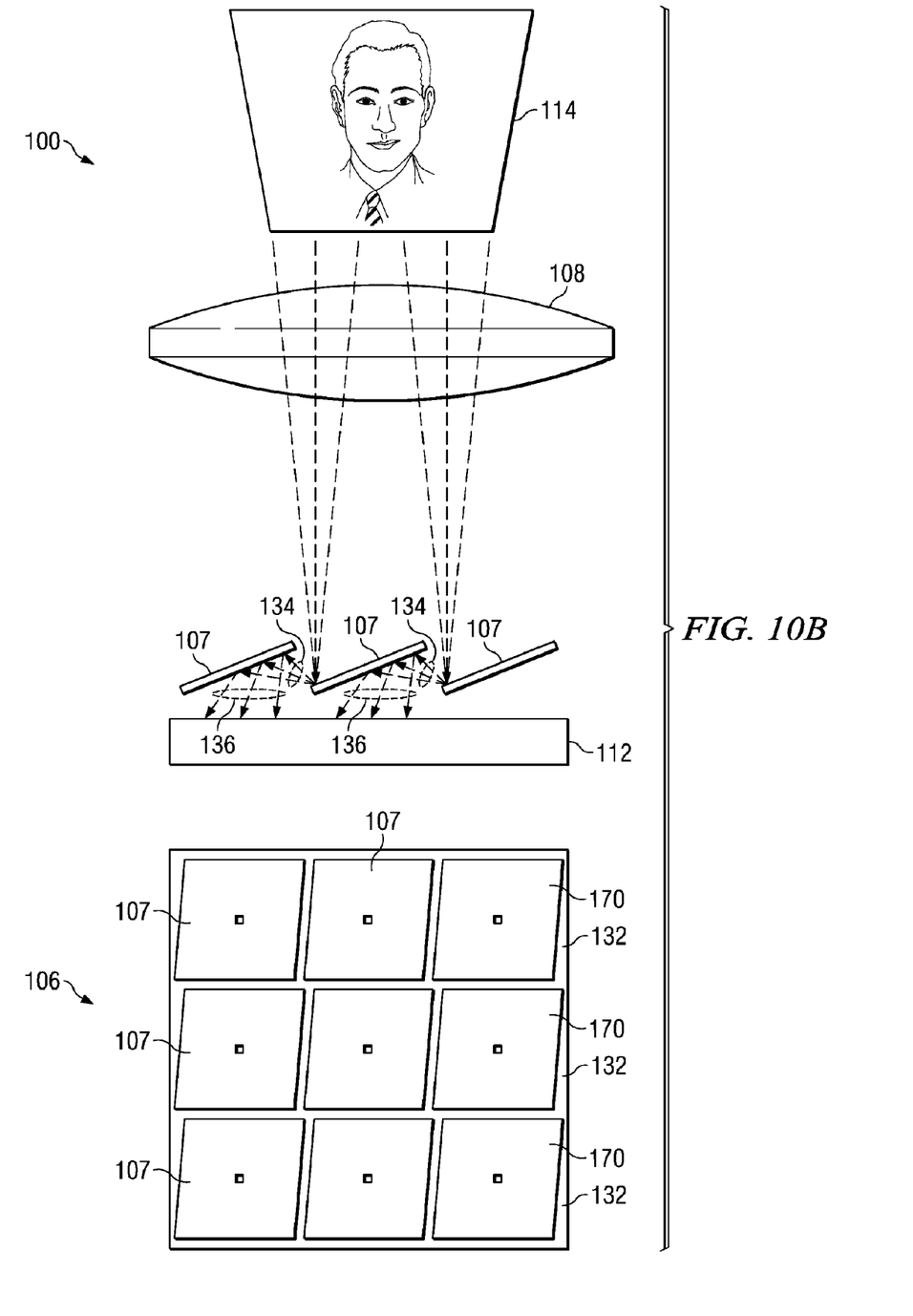
FIG. 10B is a diagram of an optical projection/camera system with a presently disclosed integrated image sensor embodiment.

FIGS. 10A-10B illustrate yet another embodiment whereby a CCD or a CMOS image sensor 112 may be integrated with a DMD 106 on the same semiconductor substrate. FIG. 10A illustrates a top-down view of a 3×3 array of DMD cells 107. There may be thousands or millions of these DMD cells or pixels 107 within a DMD chip 106. Because of the nature of the DMD chip 106, there are areas 132 on the die surface that are not completely covered by the pixel mirrors 107. These uncovered areas 132 are spacings or gaps between the DMD pixels 107 that must exist in order for the pixels 107 to actuate or tilt. For a typical DMD chip 106 today, the unused area 132 is approximately equivalent to a pixel cell area for a CCD or a CMOS image sensor 112. Therefore, it is feasible to add camera functionality to the semiconductor substrate of the DMD chip 106 in these unused areas 132 thereby providing dual functionality in a single chip without degrading the function or utility of either. Furthermore, with the coming of wafer-level packaging of DMD chips 106, there will be other large areas (not shown) of unused silicon around the perimeter of a DMD chip 106 that could also be used to include the imaging CCD or CMOS circuitry 112.

FIG. 10B further illustrates additional advantages of integrating a CCD or a CMOS imaging sensor 112 with a DMD chip 106 on the same semiconductor substrate. The 3×3 array of DMD cells 107 of FIG. 10B is similar to that of FIG. 10A except that the DMD mirrors 107 in FIG. 10B are actuating to one side, as is illustrated by the slight tilting of the DMD mirrors 107. Depending on whether the DMD mirrors 107 are operating in an "on" or "off" state, they will tilt to a certain angle. As a result, additional light may be captured or collected by a CCD or CMOS image cell 112 within an optical projection system 100. As is shown in the system 100, the top and the bottom of the DMD mirrors 107 may be deposited with the same material, typically aluminum or some other reflective metallic material. As an incoming light or image 114 is collected by a camera lens 108 and is being focused upon the DMD mirrors 107, it is once reflected by the top surface of the DMD mirror 107 towards an adjacent or neighboring DMD mirror 107. The once-reflected light 134 can then be twice reflected by the bottom surface of the neighboring DMD mirror 107. The twice-reflected light 136 is then captured or collected by the CCD or CMOS image cell 112 that lies between unused areas 132 of a DMD chip 106. In other words, when the DMD mirrors 107 substantially actuate in one direction such that the electronic device is being used in camera mode, they form a rhomboid reflector or periscope action which helps to guide more light to be captured or collected by the CCD/CMOS cells 112 situated underneath the DMD mirrors 107. Additionally, there may be multiple reflections (not shown) before the CCD/CMOS cells 112 capture the additional light. Also, the CCD/CMOS cells 112 may capture an incoming light directly without any reflection by the DMD mirrors 107.

Other advantages that could result in low cost by adding functionality due to sharing of many components, especially electronics and optics, may include multi-functional use of the common optics including integrating projector and camera image processing electronics on a single chip. Furthermore, additional functionalities may include sharing a single dynamic random access memory (DRAM) chip to store images from the projector and the camera, sharing a system control microprocessor, or sharing FLASH memory for programming both camera control operations and projector control operations. Also, power supply and battery, as well as universal serial bus (USB) ports and other input/output (I/O) ports may also be shared. In addition, a new digital signal processing (DSP) chip integrating many of these functions may also be added to the electronic device.

It will be appreciated by those of ordinary skill in the art that the invention can be embodied in other specific forms without departing from the spirit or essential character thereof. For example, although an image-capturing device such as a CCD or CMOS image sensor may be integrated within an optical projection system, an image-projecting device such as a DMD or a DLP chip may be integrated within an optical imaging system like a digital camera or camcorder or even with a cellular phone or hand-held gaming device. In addition, although several embodiments have been illustrated, other orientations of the image sensor (CCD or CMOS) and image projector (DMD and DLP) not shown may nevertheless work encompassing the same or similar concepts of the presently disclosed embodiments. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. §1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A device, comprising:
   a light source operable to project a light beam;
   a projection lens:
   a reflective light modulator comprising a plurality of switching elements operable to receive the light beam along a first optical path extending from the light source to the reflective light modulator and to reflectively modulate the light beam along a second optical path extending from the light modulator through the projection lens; and
   an image sensor situated substantially along the first optical path, wherein the image sensor is configured to capture an image from the second optical path passing through the projection lens to the reflective light modulator and reflected along the first optical path by the switching elements of the reflective light modulator.

2. The device according to claim 1, wherein the reflective light modulator comprises a digital micromirror device.

3. The device according to claim 1, wherein the image sensor comprises a CCD or a CMOS image sensor.

4. A device comprising:
   a light source;
   a digital micromirror device;
   an image sensor; and
   a mechanical structure for selectively moving the digital micromirror device and the image sensor alternately into and out of alignment with an optical path; wherein when the digital micromirror device is moved into alignment the mechanical structure places the digital micromirror device into a position for receiving light from the light source and for reflectively modulating the light for projecting in a direction along the optical path, and wherein when the image sensor is moved into alignment the mechanical structure places the image sensor into a position for capturing a second image from light received in an opposite direction along the same optical path.

5. The device according to claim 4, wherein the mechanical structure comprises a translational switching mechanism, a rotational switching mechanism, or a combination translational and rotational switching mechanism.

6. The device according to claim 4, wherein the digital micromirror device and the image sensor are formed on a same semiconductor substrate.

7. An optical projection system, comprising:
   a light source;
   a spatial light modulator positioned to modulate light received along an optic path from the light source;
   a projection lens positioned to receive the modulated light from the spatial light modulator for display onto a display surface;
   an image sensor mounted for selective relative movement between a normal position out of the optic path between the light source and the spatial light modulator and an image capture position within the optic path between the light source and the spatial light modulator whereby, in the image capture position, an image may be captured from light received through the projection lens and reflected by the spatial light modulator onto the image sensor.

8. A handheld device having image capture and image projection capability, comprising:
   a light source;
   a reflective light modulator positioned to modulate light received along an optic path from the light source;
   a projection lens positioned to receive the modulated light from the reflective light modulator for display onto a display surface;
   an image sensor; and
   a mechanical structure coupling the image sensor and the reflective light modulator for selective relative movement of the image sensor between an image projection position wherein the image sensor is out of the optic path between the light source and the reflective light modulator and an image capture position wherein the image sensor captures an image from light directed through the projection lens and reflected by the reflective light modulator.

* * * * *